United States Patent
Wang et al.

(10) Patent No.: US 12,334,804 B2
(45) Date of Patent: Jun. 17, 2025

(54) SWITCHING POWER CONVERTING APPARATUS

(71) Applicant: P-DUKE TECHNOLOGY CO., LTD., Taichung (TW)

(72) Inventors: Hao-Jen Wang, Taichung (TW); Cheng-Te Tsai, Taichung (TW); Hsiao-Hua Chi, Taichung (TW); Lien-Hsing Chen, Taichung (TW); Chun-Ping Chang, Taichung (TW); Liang-Jhou Dai, Taichung (TW)

(73) Assignee: P-DUKE TECHNOLOGY CO., LTD., Taichung (TW)

( * ) Notice: Subject to any disclaimer, the term of this patent is extended or adjusted under 35 U.S.C. 154(b) by 245 days.

(21) Appl. No.: 18/163,440

(22) Filed: Feb. 2, 2023

(65) Prior Publication Data
US 2024/0266938 A1 Aug. 8, 2024

(51) Int. Cl.
*H02M 1/00* (2007.01)

(52) U.S. Cl.
CPC ....... *H02M 1/0041* (2021.05); *H02M 1/0009* (2021.05); *H02M 1/007* (2021.05)

(58) Field of Classification Search
CPC .. H02M 1/0041; H02M 1/0009; H02M 1/007; H02M 3/33523
See application file for complete search history.

(56) References Cited

U.S. PATENT DOCUMENTS

| 2015/0318777 | A1* | 11/2015 | Pasqua | H02M 1/08 363/21.13 |
|---|---|---|---|---|
| 2019/0006948 | A9* | 1/2019 | Fang | H02M 3/33507 |
| 2021/0099094 | A1 | 4/2021 | Shen et al. | |
| 2021/0376734 | A1 | 12/2021 | Lin et al. | |

FOREIGN PATENT DOCUMENTS

| DE | 10330605 A1 | 1/2005 |
|---|---|---|
| TW | 201933744 A | 8/2019 |

OTHER PUBLICATIONS

Office Action dated Sep. 7, 2023 of the corresponding German patent application No. 102023105593.3.
Office Action dated Oct. 16, 2023 of the corresponding Taiwan patent application No. 111139474.

* cited by examiner

*Primary Examiner* — Adolf D Berhane
*Assistant Examiner* — Afework S Demisse
(74) *Attorney, Agent, or Firm* — MUNCY, GEISSLER, OLDS & LOWE, P.C.

(57) ABSTRACT

An improved switching power converting apparatus (10) includes a power converting circuit (102), a sampling circuit (104), a signal gain adjustment circuit (106), a frequency limiting circuit (108) and a pulse width modulation controller (110). The sampling circuit (104) is configured to detect the power converting circuit (102) to obtain a sampled signal (Vs) and transmit the sampled signal (Vs) to the signal gain adjustment circuit (106). The signal gain adjustment circuit (106) is configured to adjust the sampled signal (Vs) to obtain a control signal (Vcon) and transmit the control signal (Vcon) to the frequency limiting circuit (108). The pulse width modulation controller (110) is configured to control an operating frequency of the pulse width modulation controller (110) based on the control signal (Vcon).

10 Claims, 12 Drawing Sheets

SWITCHING POWER CONVERTING APPARATUS

BACKGROUND OF THE DISCLOSURE

Technical Field

The present disclosure relates to a switching power converting apparatus, and especially relates to an improved switching power converting apparatus.

Description of Related Art

The pulse width modulation controller plays an important role in the switching power converting apparatus, which is used to control and switch the power switch to output voltage to the back-end load.

The related art pulse width modulation controller may be classified into the first-type pulse width modulation controller and the second-type pulse width modulation controller. If the resistance value of the external resistor of the related art pulse width modulation controller is inversely proportional to the operating frequency of the related art pulse width modulation controller switching the power switch (namely, if the resistance value of the external resistor is larger, the operating frequency is lower; if the resistance value of the external resistor is smaller, the operating frequency is higher), this pulse width modulation controller belongs to the first-type pulse width modulation controller. If the resistance value of the external resistor of the related art pulse width modulation controller is proportional to the operating frequency of the related art pulse width modulation controller switching the power switch (namely, if the resistance value of the external resistor is larger, the operating frequency is higher; if the resistance value of the external resistor is smaller, the operating frequency is lower), this pulse width modulation controller belongs to the second-type pulse width modulation controller. The datasheet of the pulse width modulation controller may be looked up to confirm whether the pulse width modulation controller belongs to the first-type pulse width modulation controller or the second-type pulse width modulation controller, so as to assist circuit designers in designing the operating frequency for the power switch.

However, regardless of whether it is the first-type pulse width modulation controller or the second-type pulse width modulation controller, since the resistance value of the above-mentioned external resistor is fixed after the product is manufactured, the operating frequency of the related art pulse width modulation controller switching the power switch is also fixed. The disadvantages of the fixed operating frequency are that: if the fixed operating frequency is high, the efficiency is low at light load; if the fixed operating frequency is low, the magnetic component is easy to saturate at heavy load.

SUMMARY OF THE DISCLOSURE

In order to solve the above-mentioned problems, an object of the present disclosure is to provide an improved switching power converting apparatus.

In order to achieve the object of the present disclosure mentioned above, the improved switching power converting apparatus of the present disclosure includes a power converting circuit, a sampling circuit, a signal gain adjustment circuit, a frequency limiting circuit and a pulse width modulation controller. The sampling circuit is electrically connected to the power converting circuit. The signal gain adjustment circuit is electrically connected to the sampling circuit. The frequency limiting circuit is electrically connected to the signal gain adjustment circuit. The pulse width modulation controller is electrically connected to the power converting circuit and the frequency limiting circuit. Moreover, the sampling circuit is configured to detect the power converting circuit to obtain a sampled signal and transmit the sampled signal to the signal gain adjustment circuit. The signal gain adjustment circuit is configured to adjust the sampled signal to obtain a control signal and transmit the control signal to the frequency limiting circuit. The pulse width modulation controller is configured to control an operating frequency of the pulse width modulation controller based on the control signal.

Moreover, in an embodiment of the improved switching power converting apparatus of the present disclosure mentioned above, the pulse width modulation controller includes an oscillator timing control circuit electrically connected to the frequency limiting circuit. Moreover, the oscillator timing control circuit includes an internal voltage source electrically connected to the frequency limiting circuit. Moreover, the internal voltage source is configured to transmit an internal voltage to the frequency limiting circuit to generate an internal current correspondingly. The frequency limiting circuit is configured to change the internal current based on the control signal to limit a maximum operating frequency and a minimum operating frequency of the operating frequency.

Moreover, in an embodiment of the improved switching power converting apparatus of the present disclosure mentioned above, the frequency limiting circuit includes a first resistor and a second resistor. The first resistor is electrically connected to the pulse width modulation controller. The second resistor is electrically connected to the pulse width modulation controller, the signal gain adjustment circuit and the first resistor. Moreover, if a resistance value of the frequency limiting circuit is inversely proportional to the operating frequency, the pulse width modulation controller belongs to a first-type pulse width modulation controller. If the resistance value of the frequency limiting circuit is proportional to the operating frequency, the pulse width modulation controller belongs to a second-type pulse width modulation controller. Moreover, if the pulse width modulation controller belongs to the first-type pulse width modulation controller, the first resistor is configured to set the minimum operating frequency, and the second resistor is configured to set the maximum operating frequency, and the signal gain adjustment circuit is configured to output the control signal: to be equal to the internal voltage when the sampled signal is less than a first value, and to be inversely proportional to the sampled signal when the sampled signal is between the first value and a second value, and to be a first level when the sampled signal is greater than the second value. Moreover, if the pulse width modulation controller belongs to the second-type pulse width modulation controller, the first resistor is configured to set the maximum operating frequency, and the second resistor is configured to set the minimum operating frequency, and the signal gain adjustment circuit is configured to output the control signal: to be the first level when the sampled signal is less than the first value, and to be proportional to the sampled signal when the sampled signal is between the first value and the second value, and to be equal to the internal voltage when the sampled signal is greater than the second value.

Moreover, in an embodiment of the improved switching power converting apparatus of the present disclosure mentioned above, the pulse width modulation controller further includes a pulse width modulation control circuit, a comparator and a comparator reference voltage source. The pulse width modulation control circuit is electrically connected to the power converting circuit and the oscillator timing control circuit. The comparator is electrically connected to the power converting circuit and the pulse width modulation control circuit. The comparator reference voltage source is electrically connected to the comparator. Moreover, the power converting circuit includes a voltage feedback circuit and an output end. The voltage feedback circuit is electrically connected to the pulse width modulation controller. The output end is electrically connected to the voltage feedback circuit. Moreover, the oscillator timing control circuit further includes a current mirror sub-circuit and an oscillator. The current mirror sub-circuit is electrically connected to the internal voltage source. The oscillator is electrically connected to the current mirror sub-circuit and the pulse width modulation control circuit. Moreover, the current mirror sub-circuit is configured to correspondingly generate an oscillator current based on the internal current and transmit the oscillator current to the oscillator. The oscillator is configured to generate an operating clock with the operating frequency based on the oscillator current and transmit the operating clock to the pulse width modulation control circuit. The voltage feedback circuit is configured to detect an output voltage of the output end to generate a feedback signal and transmit the feedback signal to the comparator. The comparator is configured to compare the feedback signal with a comparator reference voltage provided by the comparator reference voltage source to generate a duty cycle signal and transmit the duty cycle signal to the pulse width modulation control circuit.

Moreover, in an embodiment of the improved switching power converting apparatus of the present disclosure mentioned above, the pulse width modulation controller belongs to the first-type pulse width modulation controller; the signal gain adjustment circuit is an inverting amplifier.

Moreover, in an embodiment of the improved switching power converting apparatus of the present disclosure mentioned above, the pulse width modulation controller belongs to the second-type pulse width modulation controller; the signal gain adjustment circuit is a non-inverting amplifier.

Moreover, in an embodiment of the improved switching power converting apparatus of the present disclosure mentioned above, the pulse width modulation controller belongs to the second-type pulse width modulation controller; the signal gain adjustment circuit is a voltage follower.

Moreover, in an embodiment of the improved switching power converting apparatus of the present disclosure mentioned above, the signal gain adjustment circuit includes a digital-to-analog converter, a micro-controller and an analog-to-digital converter. The digital-to-analog converter is electrically connected to the frequency limiting circuit. The micro-controller is electrically connected to the digital-to-analog converter. The analog-to-digital converter is electrically connected to the micro-controller and the sampling circuit.

Moreover, in an embodiment of the improved switching power converting apparatus of the present disclosure mentioned above, the power converting circuit further includes a power switch, an input end, a transformer and a rectifier filter circuit. The power switch is electrically connected to the pulse width modulation controller. The input end is electrically connected to the power switch. The transformer is electrically connected to the power switch. The rectifier filter circuit is electrically connected to the transformer, the voltage feedback circuit and the output end. Moreover, the pulse width modulation control circuit is configured to control the power switch based on the operating frequency of the operating clock and the duty cycle signal.

Moreover, in an embodiment of the improved switching power converting apparatus of the present disclosure mentioned above, the sampling circuit includes an output-end sampling sub-circuit and an input-end sampling sub-circuit. The output-end sampling sub-circuit is electrically connected to the power converting circuit and the signal gain adjustment circuit. The input-end sampling sub-circuit is electrically connected to the power converting circuit and the signal gain adjustment circuit. Moreover, the output-end sampling sub-circuit is configured to detect the power converting circuit to obtain a first sampled signal. The input-end sampling sub-circuit is configured to detect the power converting circuit to obtain a second sampled signal. The sampling circuit is configured to integrate the first sampled signal and the second sampled signal to obtain the sampled signal.

The advantages of the present disclosure are to avoid the following problems caused by the fixed operating frequency: if the fixed operating frequency is high, the efficiency is low at light load; if the fixed operating frequency is low, the magnetic component is easy to saturate at heavy load.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
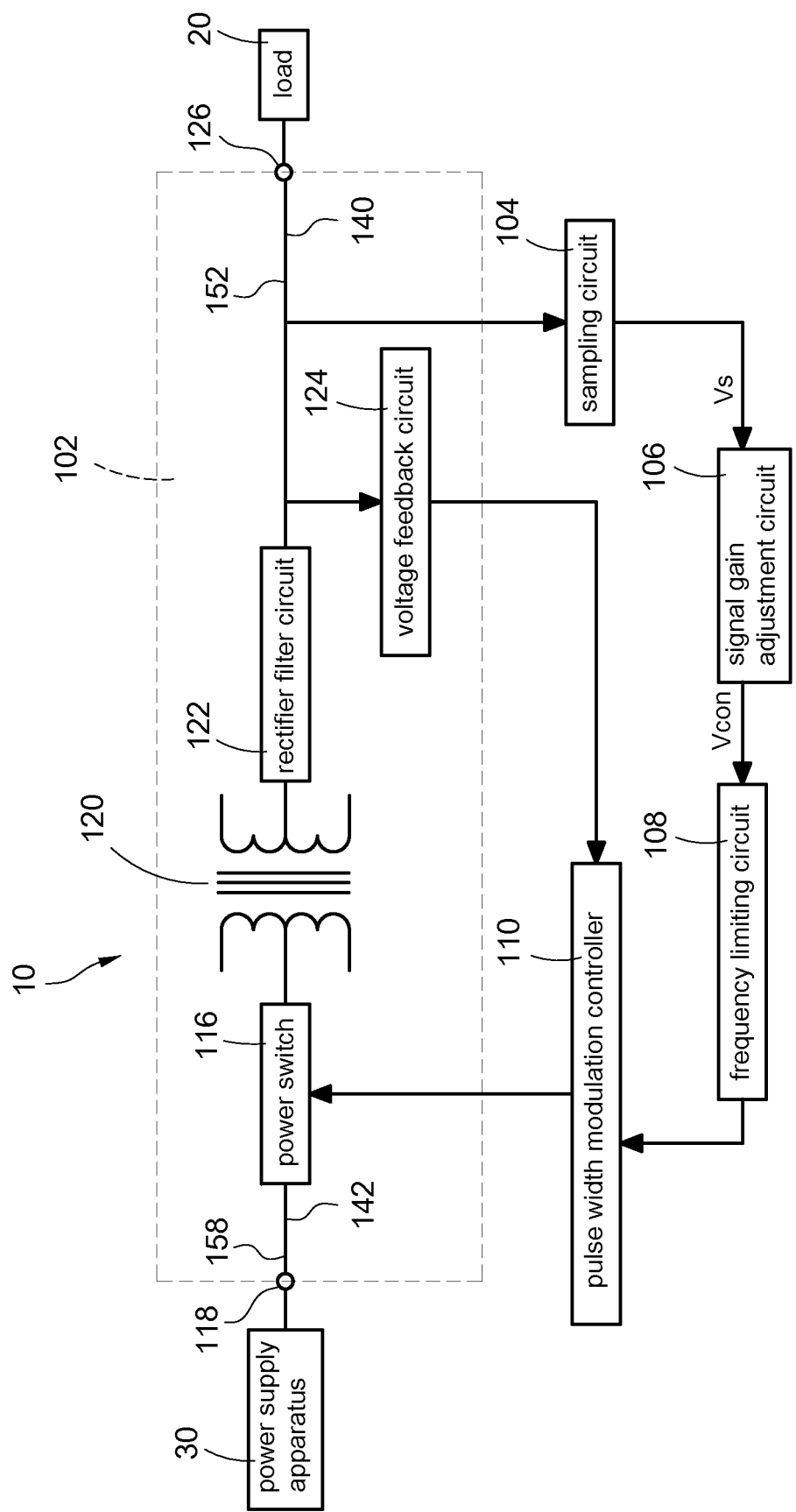
FIG. 1 shows a block diagram of the first embodiment of the improved switching power converting apparatus of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the first embodiment of the improved switching power converting apparatus 10 of the present disclosure. As shown in FIG. 1, an improved switching power converting apparatus 10 of the present disclosure is applied to a load 20 and a power supply apparatus 30. The improved switching power converting apparatus 10 is used to receive an input power 142 from the power supply apparatus 30 and convert the input power 142 to supply power to the load 20. The improved switching power converting apparatus 10 includes a power converting circuit 102, a sampling circuit 104, a signal gain adjustment circuit 106, a frequency limiting circuit 108 and a pulse width modulation controller 110. The power converting circuit 102 includes a power switch 116, an input end 118, a transformer 120, a rectifier filter circuit 122, a voltage feedback circuit 124 and an output end 126. The aforementioned components are electrically connected to each other.

The sampling circuit 104 is configured to detect the power converting circuit 102 to obtain a sampled signal Vs and transmit the sampled signal Vs to the signal gain adjustment circuit 106. The signal gain adjustment circuit 106 is configured to adjust the sampled signal Vs (namely, adjust a signal level of the sampled signal Vs) to obtain a control signal Vcon and transmit the control signal Vcon to the frequency limiting circuit 108. The pulse width modulation controller 110 is configured to control an operating frequency of the pulse width modulation controller 110 based on the control signal Vcon, wherein the details are described later.

The sampling circuit 104 is, for example but not limited to, a voltage sensor, a current sensor or a Hall sensor; if the sampling circuit 104 is a voltage sensor, the sampled signal Vs is a voltage signal; if the sampling circuit 104 is a current sensor or a Hall sensor, the sampled signal Vs is a current signal. The power switch 116 is, for example but not limited to, a bipolar junction transistor (BJT) or a metal oxide semiconductor field effect transistor (MOSFET). The rectifier filter circuit 122 is configured to rectify the switching action generated by the power switch 116 into a direct current signal through a rectifying component (such as a diode) and a filtering circuit (such as an inductor-capacitor filter). The pulse width modulation controller 110 is, for example but not limited to, any type of pulse width modulation controllers in the market.

Figure 2:
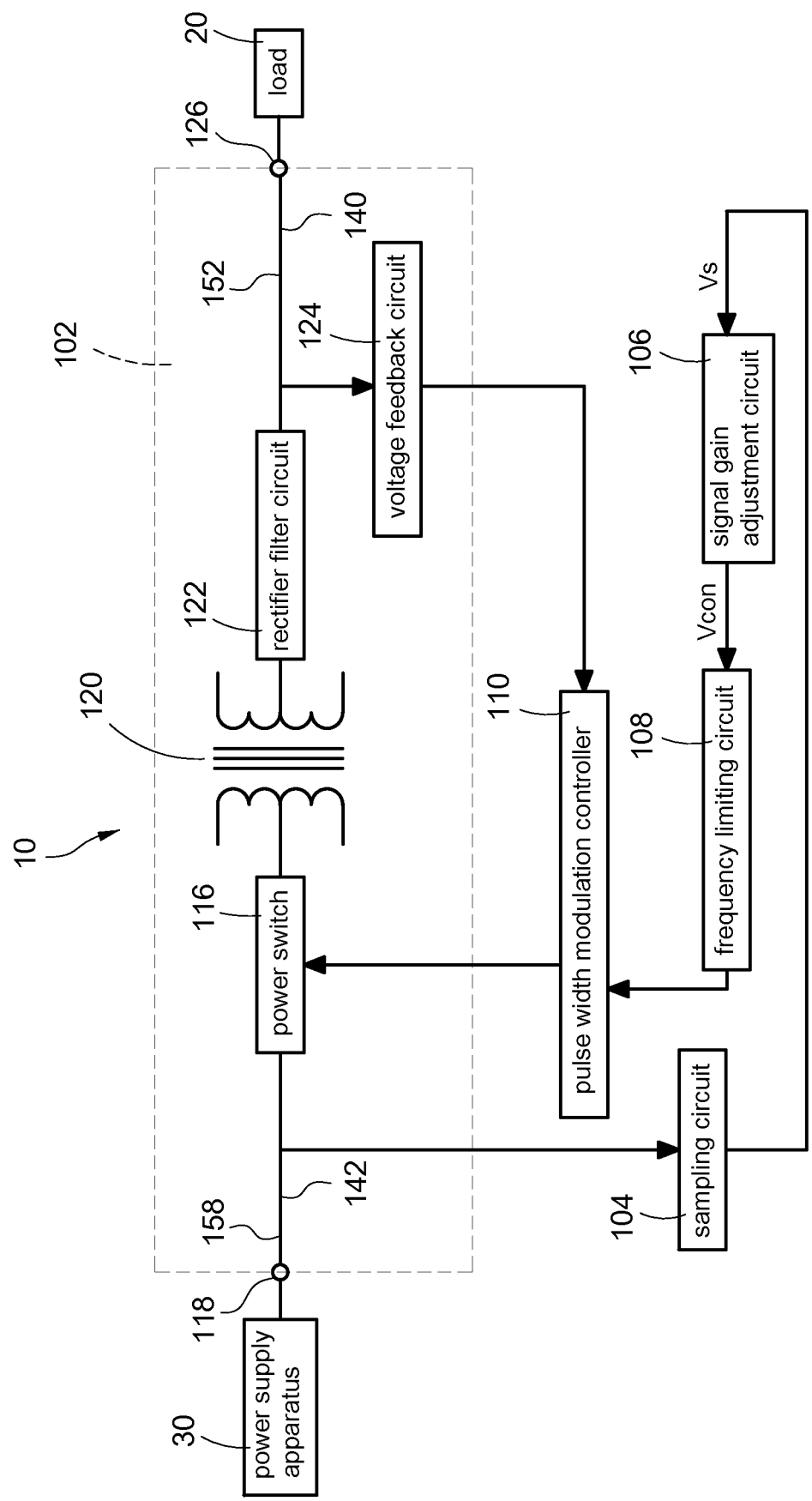
FIG. 2 shows a block diagram of the second embodiment of the improved switching power converting apparatus of the present disclosure.

FIG. 2 shows a block diagram of the second embodiment of the improved switching power converting apparatus 10 of the present disclosure. The descriptions of the components shown in FIG. 2 which are the same as the components shown in FIG. 1 are not repeated here for brevity.

Figure 3:
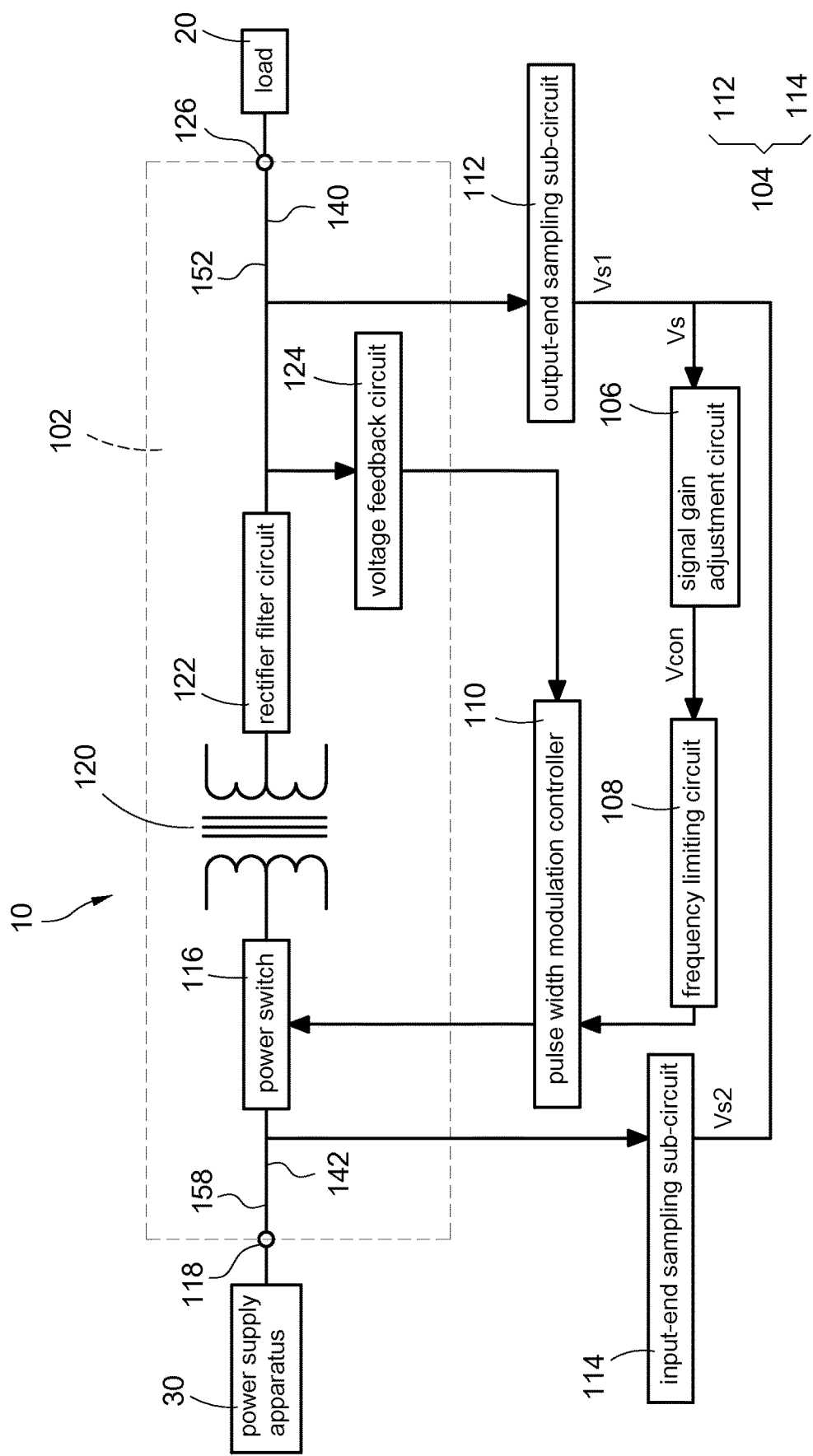
FIG. 3 shows a block diagram of the third embodiment of the improved switching power converting apparatus of the present disclosure.

FIG. 3 shows a block diagram of the third embodiment of the improved switching power converting apparatus 10 of the present disclosure. The descriptions of the components shown in FIG. 3 which are the same as the components shown in FIG. 1 are not repeated here for brevity. As shown in FIG. 3, the sampling circuit 104 includes an output-end sampling sub-circuit 112 and an input-end sampling sub-circuit 114. The output-end sampling sub-circuit 112 and the input-end sampling sub-circuit 114 are electrically connected to the power converting circuit 102 and the signal gain adjustment circuit 106. The output-end sampling sub-circuit 112 is configured to detect the power converting circuit 102 to obtain a first sampled signal Vs1. The input-end sampling sub-circuit 114 is configured to detect the power converting circuit 102 to obtain a second sampled signal Vs2. The sampling circuit 104 is configured to integrate the first sampled signal Vs1 and the second sampled signal Vs2 to obtain the sampled signal Vs.

The output-end sampling sub-circuit 112 and the input-end sampling sub-circuit 114 are, for example but not limited to, voltage sensors, current sensors or Hall sensors; if the output-end sampling sub-circuit 112 and the input-end sampling sub-circuit 114 are voltage sensors, the first sampled signal Vs1 and the second sampled signal Vs2 are voltage signals; if the output-end sampling sub-circuit 112 and the input-end sampling sub-circuit 114 are current sensors or Hall sensors, the first sampled signal Vs1 and the second sampled signal Vs2 are current signals.

Figure 5:
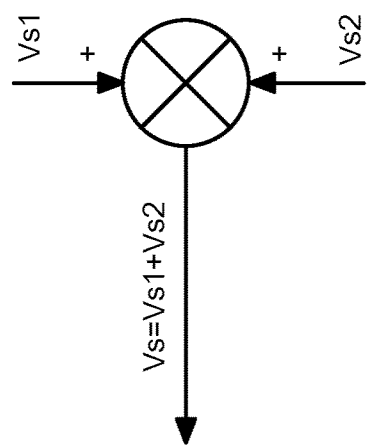
FIG. 5 shows a logical relationship diagram of another embodiment of the first sampled signal, the second sampled signal and the sampled signal of the present disclosure.

FIG. 5 shows a logical relationship diagram of another embodiment of the first sampled signal Vs1, the second sampled signal Vs2 and the sampled signal Vs of the present disclosure. FIG. 5 shows another embodiment of how to achieve the above-mentioned sampling circuit 104 configured to integrate the first sampled signal Vs1 and the second sampled signal Vs2 to obtain the sampled signal Vs. As shown in FIG. 5, the sampled signal Vs is the first sampled signal Vs1 plus the second sampled signal Vs2; namely, the first sampled signal Vs1 and the second sampled signal Vs2 are considered and processed simultaneously to form the sampled signal Vs.

Please refer to FIG. 1, FIG. 2 and FIG. 3 again. The sampling circuit 104 may be arranged at the output end 126 as shown in FIG. 1, or the sampling circuit 104 may be arranged at the input end 118 as shown in FIG. 2, or the sampling circuit 104 (including the output-end sampling sub-circuit 112 and the input-end sampling sub-circuit 114) may be simultaneously arranged at the output end 126 and the input end 118 as shown in FIG. 3. Furthermore, the sampling circuit 104 may also be connected to the power switch 116 to obtain the sampled signal Vs, or the sampling circuit 104 may also be connected to any place of the power converting circuit 102 to obtain the sampled signal Vs.

Figure 6:
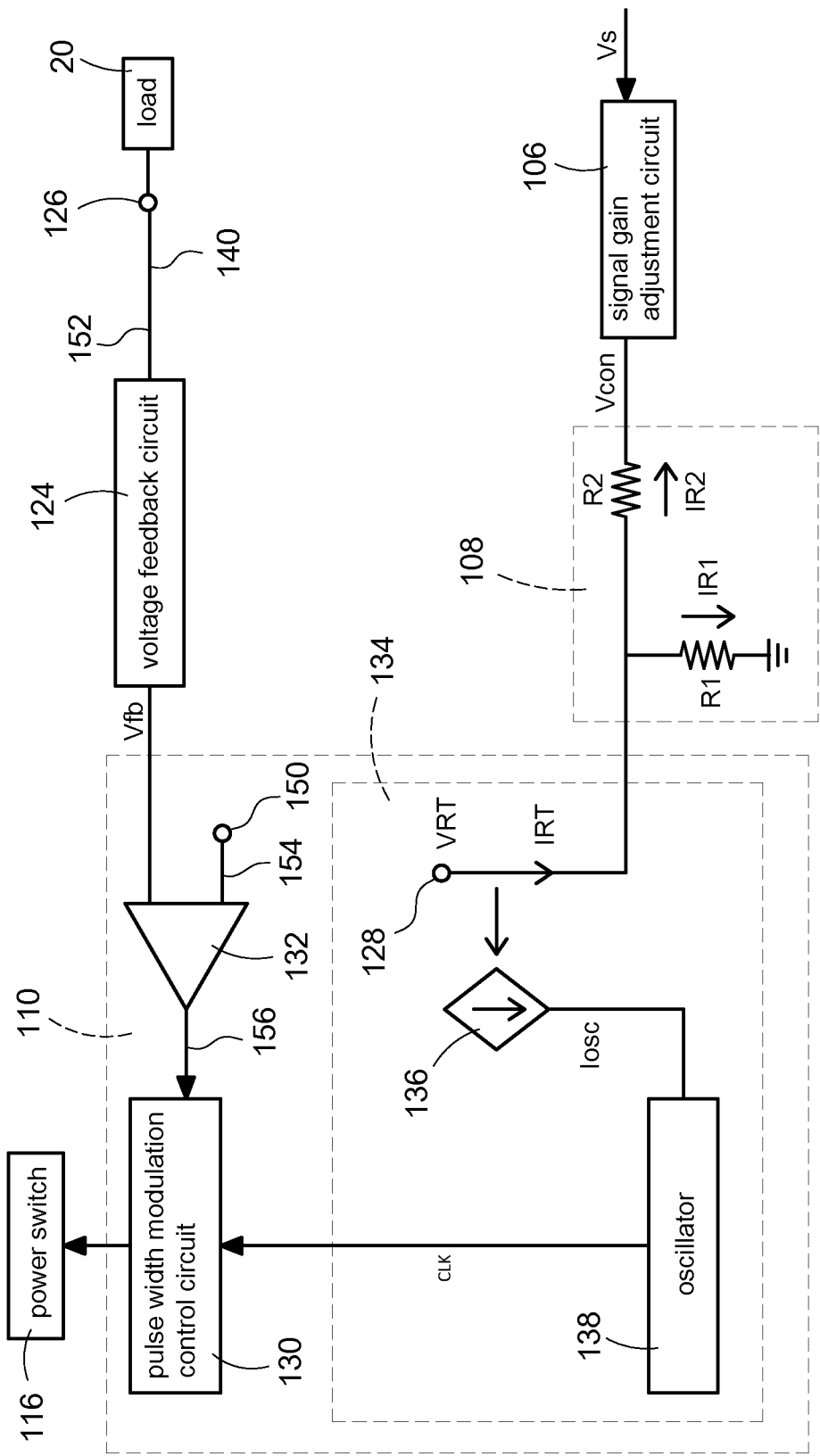
FIG. 6 shows a circuit block diagram of an embodiment of the pulse width modulation controller and the frequency limiting circuit of the present disclosure.

FIG. 6 shows a circuit block diagram of an embodiment of the pulse width modulation controller 110 and the frequency limiting circuit 108 of the present disclosure. The descriptions of the components shown in FIG. 6 which are the same as the components shown in FIG. 1 are not repeated here for brevity. As shown in FIG. 6, the pulse width modulation controller 110 includes a pulse width modulation control circuit 130, a comparator 132, an oscillator timing control circuit 134 and a comparator reference voltage source 150. The oscillator timing control circuit 134 includes an internal voltage source 128, a current mirror sub-circuit 136 and an oscillator 138. The frequency limiting circuit 108 includes a first resistor R1 and a second resistor R2. The aforementioned components are electrically connected to each other.

As mentioned above, the pulse width modulation controller 110 is, for example but not limited to, any type of pulse width modulation controllers in the market, so that the pulse width modulation control circuit 130, the comparator 132, the oscillator timing control circuit 134, the comparator reference voltage source 150, the internal voltage source 128, the current mirror sub-circuit 136 and the oscillator 138 are also, for example but not limited to, components within any type of pulse width modulation controllers in the market.

In an example but not limiting the present disclosure, in FIG. 1 and FIG. 6, removing the sampling circuit 104, the signal gain adjustment circuit 106 and the second resistor R2 may obtain a peripheral circuit applied to the pulse width modulation controllers in the market. The peripheral circuit applied to the pulse width modulation controllers in the market has a first resistor R with one end which is grounded and the other end which is connected to the internal voltage source 128. The internal voltage source 128 transmits an internal voltage VRT to the first resistor R1 to generate an internal current IRT correspondingly. The user changes the first resistor R1 to change the internal current IRT. The pulse width modulation controller detects the change of the internal current IRT to change the operating frequency (namely, the switching frequency) of the power switch 116 accordingly.

Here, the pulse width modulation controllers are classified into the first-type pulse width modulation controller and the second-type pulse width modulation controller. If the resistance value of the first resistor R1 is inversely proportional to the operating frequency (namely, if the resistance value is larger, the operating frequency is lower; if the resistance value is smaller, the operating frequency is higher), this pulse width modulation controller 110 belongs to the first-type pulse width modulation controller. If the resistance value of the first resistor R1 is proportional to the operating frequency (namely, if the resistance value is larger, the operating frequency is higher; if the resistance value is smaller, the operating frequency is lower), this pulse width modulation controller 110 belongs to the second-type pulse width modulation controller. The datasheet of the pulse width modulation controller may be looked up to confirm whether the pulse width modulation controller belongs to the first-type pulse width modulation controller or the second-type pulse width modulation controller. However, regardless of whether it is the first-type pulse width modulation controller or the second-type pulse width modulation controller, since the resistance value of the first resistor R1 is fixed after the product is manufactured, the operating frequency is also fixed. The disadvantages of the fixed operating frequency are that: if the fixed operating frequency is high, the efficiency is low at light load; if the fixed operating frequency is low, the magnetic component is easy to saturate at heavy load.

The operating frequency of the present disclosure may be changed based on the amplitude of the sampled signal Vs, so as to avoid the problems caused by the above-mentioned fixed operating frequency. Please refer to FIG. 1 of the present disclosure again; the sampled signal Vs is obtained by detecting an output current 140 of the output end 126 by the sampling circuit 104. Please refer to FIG. 2 of the present disclosure again; the sampled signal Vs is obtained by detecting an input current 158 of the input end 118 by the sampling circuit 104. Please refer to FIG. 3 of the present disclosure again; the sampled signal Vs is obtained by detecting the output current 140 of the output end 126 by the output-end sampling sub-circuit 112 and by detecting the input current 158 of the input end 118 by the input-end sampling sub-circuit 114 (for example, using the above-mentioned contents of FIG. 3 and FIG. 5). Please refer to FIG. 1, FIG. 2 and FIG. 3 of the present disclosure again; the sampled signal Vs is proportional to the amplitude of the load 20; namely, the lighter the load 20, the smaller the sampled signal Vs, and the heavier the load 20, the larger the sampled signal Vs.

The internal voltage source 128 is configured to transmit an internal voltage VRT to the frequency limiting circuit 108 to generate an internal current IRT correspondingly. The current mirror sub-circuit 136 is configured to correspondingly generate an oscillator current Iosc based on the internal current IRT and transmit the oscillator current Iosc to the oscillator 138. The oscillator 138 is configured to generate an operating clock CLK with the operating frequency based on the oscillator current Iosc and transmit the operating clock CLK to the pulse width modulation control circuit 130.

The voltage feedback circuit 124 is configured to detect the output voltage 152 of the output end 126 to generate a feedback signal Vfb and transmit the feedback signal Vfb to the comparator 132. The comparator 132 is configured to compare the feedback signal Vfb with a comparator reference voltage 154 provided by the comparator reference voltage source 150 to generate a duty cycle signal 156 and transmit the duty cycle signal 156 to the pulse width modulation control circuit 130. The pulse width modulation control circuit 130 is configured to control the power switch 116 based on the operating frequency of the operating clock CLK and the duty cycle signal 156, wherein the duty cycle signal 156 is used to stabilize the output voltage 152.

In the present disclosure, if a resistance value (namely, a total resistance value of the first resistor R1 and the second resistor R2) of the frequency limiting circuit 108 is inversely proportional to the operating frequency, the pulse width modulation controller 110 belongs to the first-type pulse width modulation controller. If the resistance value of the frequency limiting circuit 108 is proportional to the operating frequency, the pulse width modulation controller 110 belongs to the second-type pulse width modulation controller. The present disclosure provides a negative gain control scheme for the first-type pulse width modulation controller, and provides a positive gain control scheme for the second-type pulse width modulation controller.

For the first-type pulse width modulation controller, the resistance value of the frequency limiting circuit 108 is inversely proportional to the operating frequency, and when the internal current IRT increases (namely, the resistance value of the frequency limiting circuit 108 decreases), the oscillator current Iosc, the operating clock CLK and the operating frequency all increase, and when the internal current IRT decreases (namely, the resistance value of the frequency limiting circuit 108 increases), the oscillator current Iosc, the operating clock CLK and the operating frequency all decrease.

For the second-type pulse width modulation controller, the resistance value of the frequency limiting circuit 108 is proportional to the operating frequency, and when the internal current IRT decreases (namely, the resistance value of the frequency limiting circuit 108 increases), the oscillator current Iosc, the operating clock CLK and the operating frequency all increase, and when the internal current IRT increases (namely, the resistance value of the frequency limiting circuit 108 decreases), the oscillator current Iosc, the operating clock CLK and the operating frequency all decrease.

Figure 7:
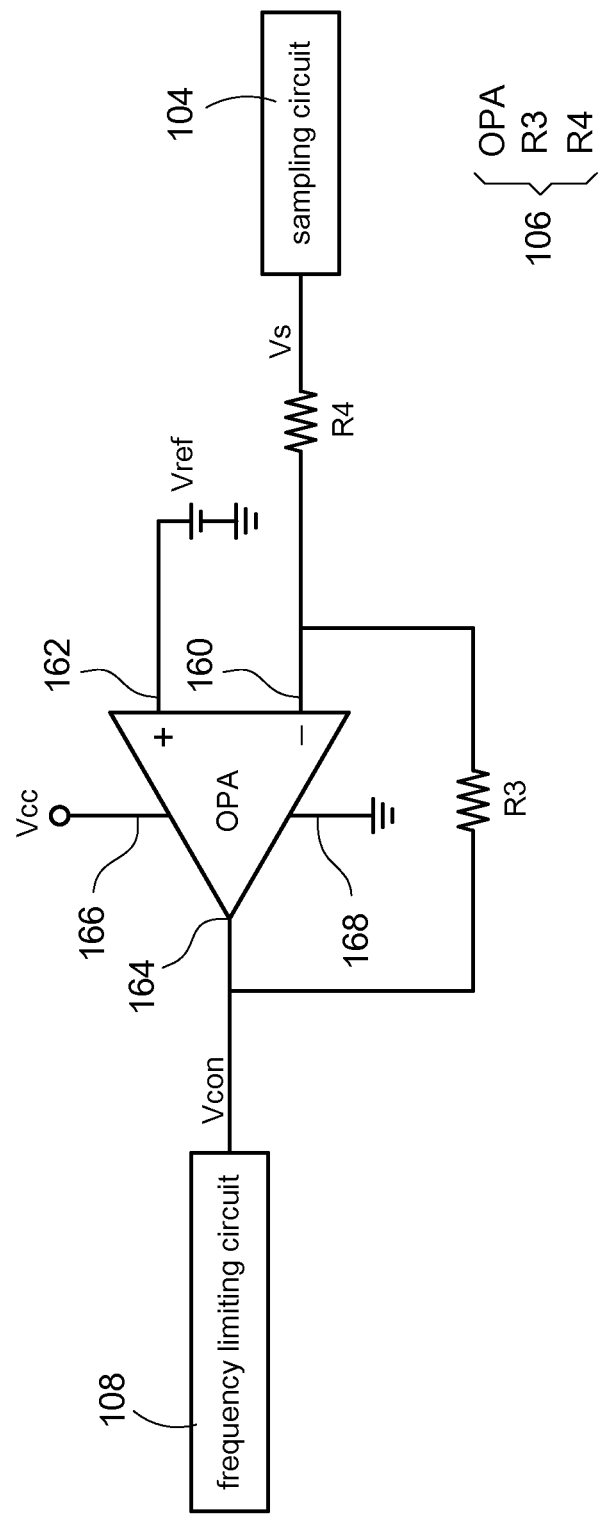
FIG. 7 shows a circuit diagram of the first embodiment of the signal gain adjustment circuit of the present disclosure.

FIG. 7 shows a circuit diagram of the first embodiment of the signal gain adjustment circuit 106 of the present disclosure. FIG. 7 is a negative gain control scheme for the first-type pulse width modulation controller. As shown in FIG. 7, the signal gain adjustment circuit 106 is an inverting amplifier, which includes an operational amplifier OPA, a third resistor R3 and a fourth resistor R4. The operational amplifier OPA includes an inverting input end 160, a non-inverting input end 162, an output end 164, a first power end 166 and a second power end 168. The non-inverting input end 162 is connected to a reference signal source vref. The first power end 166 is connected to a positive voltage source Vcc. The second power end 168 is grounded.

Figure 8:
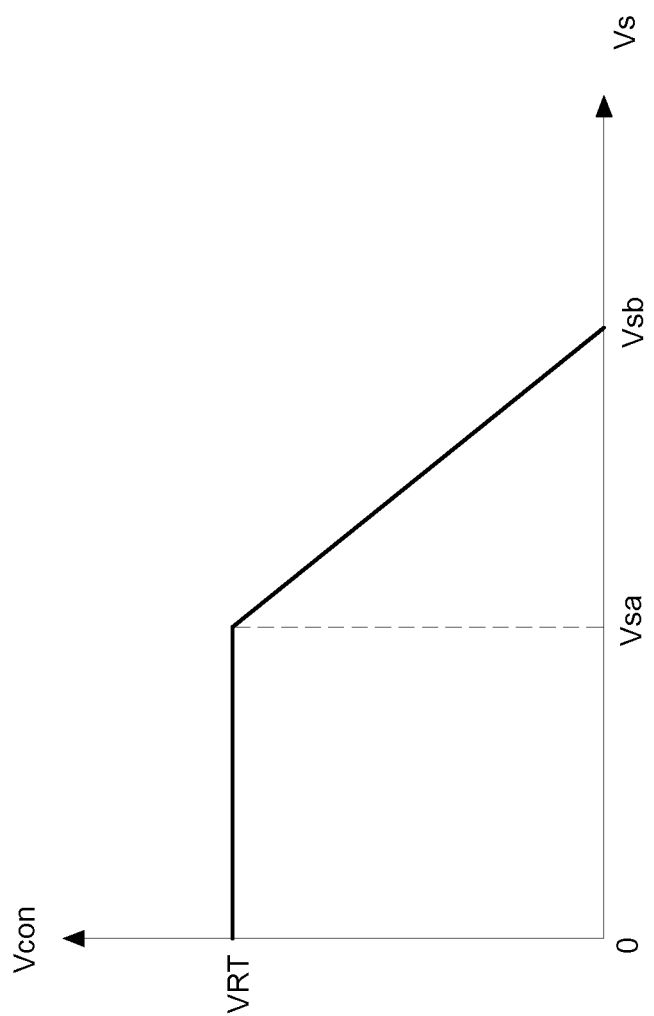
FIG. 8 shows a schematic diagram of an embodiment of the sampled signal versus the control signal applied to the negative gain control scheme of the present disclosure.

FIG. 8 shows a schematic diagram of an embodiment of the sampled signal Vs versus the control signal Vcon applied to the negative gain control scheme of the present disclosure. Please refer to FIG. 7 at the same time. FIG. 8 mainly illustrates a state of the inverting amplifier in FIG. 7 receiving the sampled signal Vs to output the control signal Vcon. First of all, it is noted that the inherent electrical characteristics of the inverting amplifier are that: the output signal is inversely proportional to the input signal, but the maximum value and the minimum value of the output signal are limited by the positive voltage source Vcc which is connected to the first power supply end 166 and a first level (namely, grounded for FIG. 7) which is connected to the second power end 168 respectively.

Therefore, when the sampled signal Vs is between a first value Vsa and a second value Vsb, the signal gain adjustment circuit 106 (namely, the inverting amplifier) is configured to output the control signal Vcon to be inversely proportional to the sampled signal Vs (namely, if the sampled signal Vs is larger, the control signal Vcon is smaller; if the sampled signal Vs is smaller, the control signal Vcon is larger).

However, the control signal Vcon is limited by the first level (namely, grounded for FIG. 7) which is connected to the second power end 168. Therefore, no matter how large the sampled signal Vs becomes, the control signal Vcon is at least zero; namely, when the sampled signal Vs is greater than the second value Vsb, the signal gain adjustment circuit 106 is configured to output the control signal Vcon as the first level (namely, zero voltage). Moreover, by performing proper circuit design on the inverting amplifier (belonging to the circuit design category of general inverting amplifiers), the appropriate second value Vsb may be designed, so that when the sampled signal Vs is greater than the second value Vsb, the control signal Vcon is zero voltage.

Moreover, the control signal Vcon is also limited by the positive voltage source Vcc which is connected to the first power end 166. Therefore, no matter how small the sampled signal Vs becomes, the control signal Vcon is at most equal to the positive voltage source Vcc, and the present disclosure is to design the control signal Vcon to be at most (for example but not limiting the present disclosure) equal to the internal voltage VRT, wherein the positive voltage source Vcc (for example, 5 volts) is greater than the internal voltage VRT (for example, 2 volts). Namely, when the sampled signal Vs is less than the first value Vsa, the signal gain adjustment circuit 106 is configured to output the control signal Vcon to be equal to the internal voltage VRT. Moreover, by performing proper circuit design on the inverting amplifier (belonging to the circuit design category of general inverting amplifiers), the appropriate first value Vsa and the appropriate control signal Vcon may be designed, so that when the sampled signal Vs is less than the first value Vsa, the control signal Vcon is equal to the internal voltage VRT.

Figure 9:
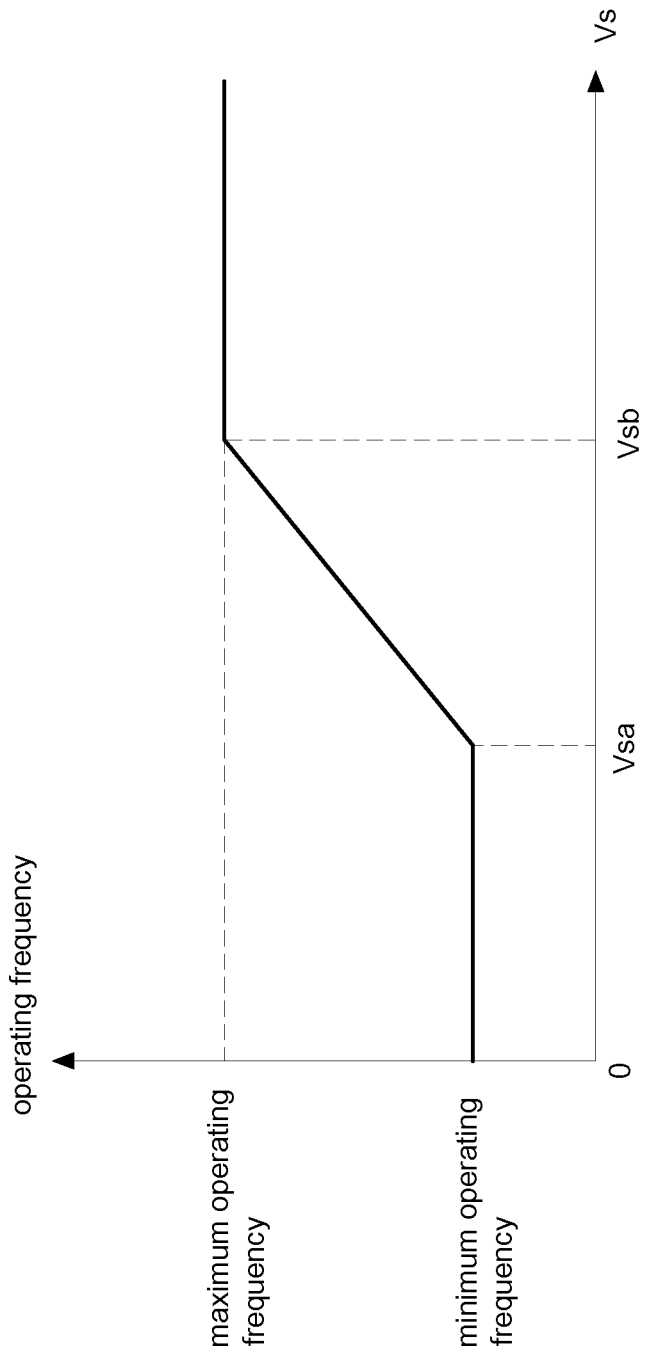
FIG. 9 shows a schematic diagram of the sampled signal of FIG. 8 versus the operating frequency.

Please refer to FIG. 6 again. The frequency limiting circuit 108 is configured to change (set) the internal current IRT based on the control signal Vcon to limit a maximum operating frequency and a minimum operating frequency of the operating frequency, which are described in detail as follows:

FIG. 9 shows a schematic diagram of the sampled signal Vs of FIG. 8 versus the operating frequency. Please refer to FIG. 6 and FIG. 8 at the same time. As mentioned above, when the sampled signal Vs is less than the first value Vsa, the control signal Vcon is equal to the internal voltage VRT. At this time, in FIG. 6, because the control signal Vcon is equal to the internal voltage VRT, a second resistor current IR2 flowing through the second resistor R2 is zero, and the internal current IRT is equal to a first resistor current IR1 flowing through the first resistor R1, and the resistance value of the frequency limiting circuit 108 (namely, the total resistance value of the first resistor R1 and the second resistor R2) becomes the largest in the absence of the second resistor R2 (because the first resistor R1 and the second resistor R2 are connected in parallel). As mentioned above, when the pulse width modulation controller 110 belongs to the first-type pulse width modulation controller, the resistance value of the frequency limiting circuit 108 is inversely proportional to the operating frequency. Therefore, when the resistance value of the frequency limiting circuit 108 is the largest, the operating frequency is the lowest, and there is only the first resistance current IR1 flowing through the first resistor R1 at this time, so that the first resistor R1 is configured to set the minimum operating frequency of the operating frequency. Namely, the minimum operating frequency may be changed by changing the first resistor R1.

As mentioned above, when the sampled signal Vs is greater than the second value Vsb, the control signal Vcon is zero voltage (namely, equivalent to ground). At this time, in FIG. 6, because the control signal Vcon is zero voltage, the internal current IRT is equal to the first resistor current IR1 plus the second resistor current IR2, and the resistance value of the frequency limiting circuit 108 becomes the minimum when the first resistor R1 is completely connected to the second resistor R2 in parallel. As mentioned above, when the pulse width modulation controller 110 belongs to the first-type pulse width modulation controller, the resistance value of the frequency limiting circuit 108 is inversely proportional to the operating frequency. Therefore, when the resistance value of the frequency limiting circuit 108 is the minimum, the operating frequency is the maximum. Because the first resistor R1 has been used to set the minimum operating frequency, the second resistor R2 is configured to set the maximum operating frequency. Namely, the maximum operating frequency may be changed by changing the second resistor R2.

As mentioned above, when the sampled signal Vs is between the first value Vsa and the second value Vsb, the control signal Vcon is inversely proportional to the sampled signal Vs (namely, if the sampled signal Vs is larger, the control signal Vcon is smaller; if the sampled signal Vs is smaller, the control signal Vcon is larger). At this time, when the pulse width modulation controller 110 belongs to the first-type pulse width modulation controller, the resistance value of the frequency limiting circuit 108 is inversely proportional to the operating frequency. Therefore, if the sampled signal Vs is larger, the control signal Vcon is smaller, the resistance value of the frequency limiting circuit 108 is smaller, and the operating frequency gradually increases; if the sampled signal Vs is smaller, the control signal Vcon is larger, the resistance value of the frequency limiting circuit 108 is larger, and the operating frequency gradually decreases.

FIG. 7, FIG. 8 and FIG. 9 mentioned above are for the negative gain control scheme of the first-type pulse width modulation controller; FIG. 10, FIG. 11, FIG. 12 and FIG. 13 described below are for the positive gain control scheme of the second-type pulse width modulation controller.

Figure 10:
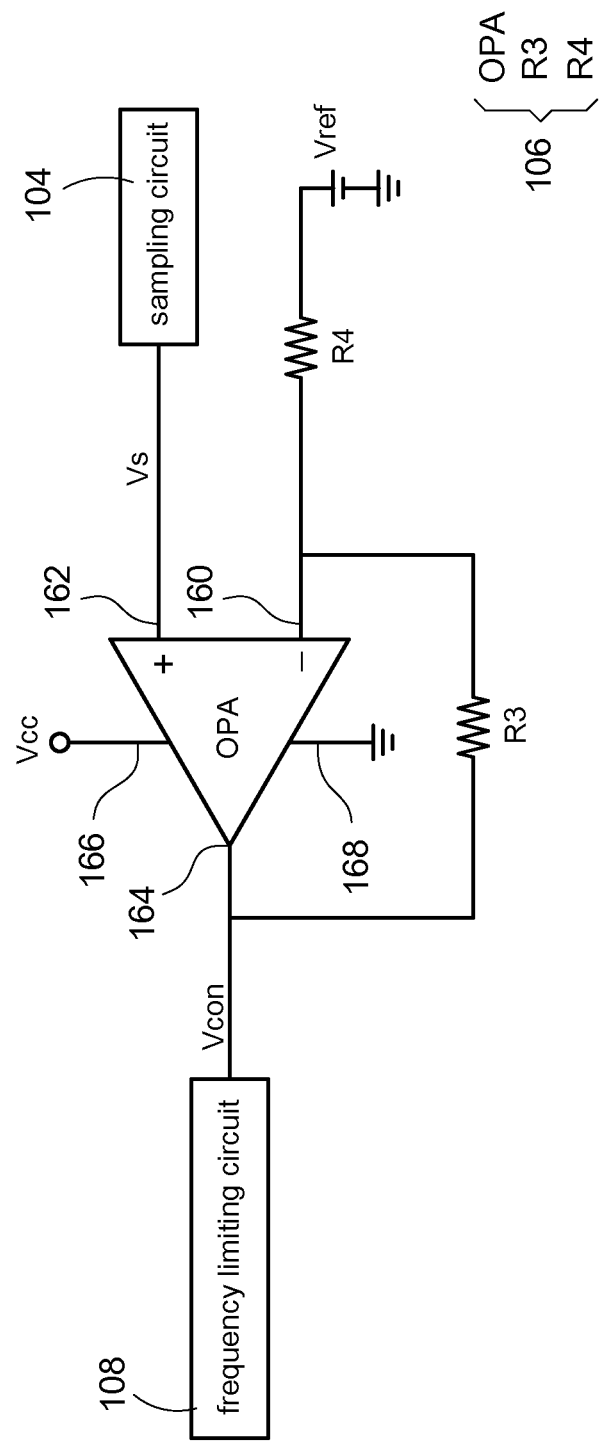
FIG. 10 shows a circuit diagram of the second embodiment of the signal gain adjustment circuit of the present disclosure.
Figure 11:
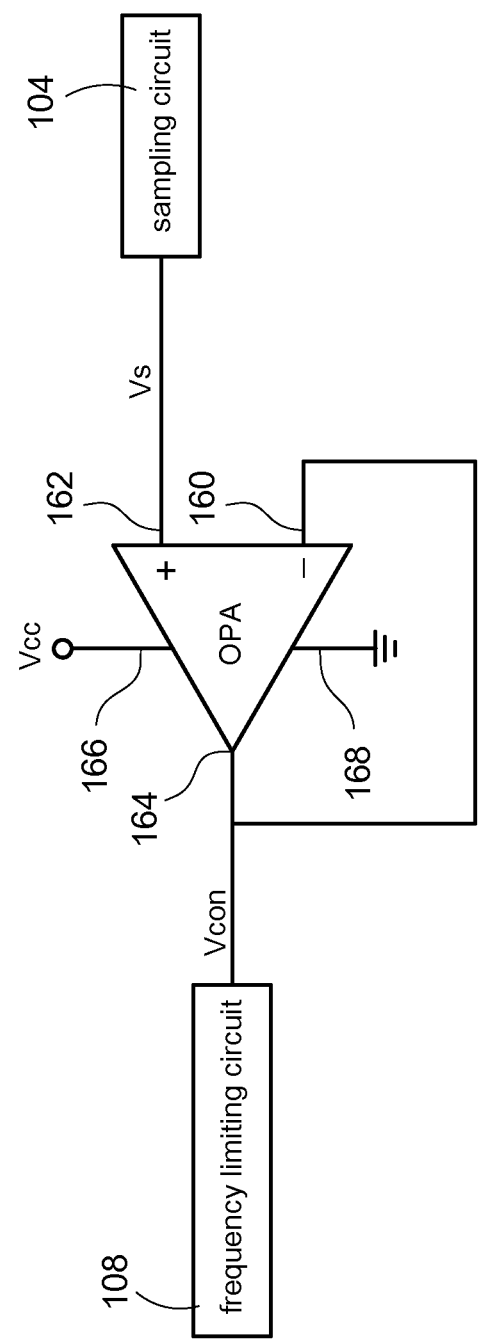
FIG. 11 shows a circuit diagram of the third embodiment of the signal gain adjustment circuit of the present disclosure.

FIG. 10 shows a circuit diagram of the second embodiment of the signal gain adjustment circuit 106 of the present disclosure. FIG. 11 shows a circuit diagram of the third embodiment of the signal gain adjustment circuit 106 of the present disclosure. FIG. 10 and FIG. 11 are positive gain control schemes for the second-type pulse width modulation controller. As shown in FIG. 10, the signal gain adjustment circuit 106 is a non-inverting amplifier, which includes an operational amplifier OPA, a third resistor R3 and a fourth resistor R4. The operational amplifier OPA includes an inverting input end 160, a non-inverting input end 162, an output end 164, a first power end 166 and a second power end 168. The inverting input end 160 is connected to a reference signal source vref through the fourth resistor R4. The first power end 166 is connected to a positive voltage source Vcc. The second power end 168 is grounded. As shown in FIG. 11, the signal gain adjustment circuit 106 is a voltage follower, which includes an operational amplifier OPA. The operational amplifier OPA includes an inverting input end 160, a non-inverting input end 162, an output end 164, a first power end 166 and a second power end 168. The first power end 166 is connected to a positive voltage source Vcc. The second power end 168 is grounded.

Figure 12:
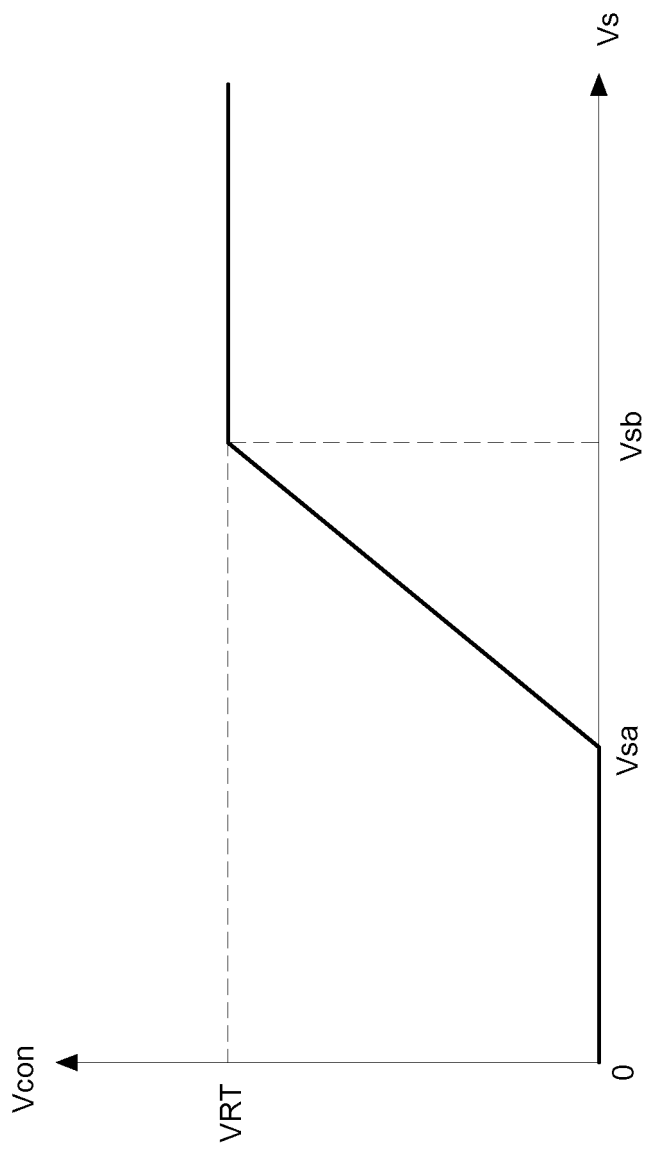
FIG. 12 shows a schematic diagram of an embodiment of the sampled signal versus the control signal applied to the positive gain control scheme of the present disclosure.

FIG. 12 shows a schematic diagram of an embodiment of the sampled signal Vs versus the control signal Vcon applied to the positive gain control scheme of the present disclosure. Please refer to FIG. 10 and FIG. 11 at the same time. FIG. 12 mainly illustrates a state of the non-inverting amplifier of FIG. 10 and the voltage follower of FIG. 11 receiving the sampled signal Vs to output the control signal Vcon. First of all, it is noted that the inherent electrical characteristics of the non-inverting amplifier and the voltage follower are that: the output signal is proportional to the input signal, but the maximum value and the minimum value of the output signal are respectively limited by the positive voltage source Vcc which is connected to the first power end 166 and a first level (namely, grounded in FIG. 10 and FIG. 11) which is connected to the second power end 168.

Therefore, when the sampled signal Vs is between a first value Vsa and a second value Vsb, the signal gain adjustment circuit 106 (namely, the non-inverting amplifier and the voltage follower) is configured to output the control signal Vcon to be proportional to the sampled signal Vs (namely, if the sampled signal Vs is larger, the control signal Vcon is larger; if the sampled signal Vs is smaller, the control signal Vcon is smaller).

However, the control signal Vcon is limited by the first level (namely, grounded for FIG. 10 and FIG. 11) which is connected to the second power end 168. Therefore, no matter how small the sampled signal Vs becomes, the control signal Vcon is at least zero. Namely, when the sampled signal Vs is smaller than the first value Vsa, the signal gain adjustment circuit 106 is configured to output the control signal Vcon as the first level (namely, zero voltage). Moreover, by performing appropriate circuit design on the non-inverting amplifier and the voltage follower (belonging to the circuit design category of general non-inverting amplifiers and voltage followers), the appropriate first value Vsa may be designed, so that when the sampled signal Vs is smaller than the first value Vsa, the control signal Vcon is zero voltage.

Moreover, the control signal Vcon is also limited by the positive voltage source Vcc which is connected to the first power end 166. Therefore, no matter how large the sampled signal Vs becomes, the control signal Vcon is at most equal to the positive voltage source Vcc. In the present disclosure, the control signal Vcon is designed to be at most (for example but not limiting the present disclosure) equal to the internal voltage VRT, wherein the positive voltage source Vcc (for example, 5 volts) is greater than the internal voltage VRT (for example, 2 volts). Namely, when the sampled signal Vs is greater than the second value Vsb, the signal gain adjustment circuit 106 is configured to output the control signal Vcon to be equal to the internal voltage VRT. Moreover, by performing appropriate circuit design on the non-inverting amplifier and the voltage follower (belonging to the circuit design category of general non-inverting amplifiers and voltage followers), the appropriate second value Vsb and the appropriate control signal Vcon may be designed, so that when the sampled signal Vs is greater than the second value Vsb, the control signal Vcon is equal to the internal voltage VRT.

Figure 13:
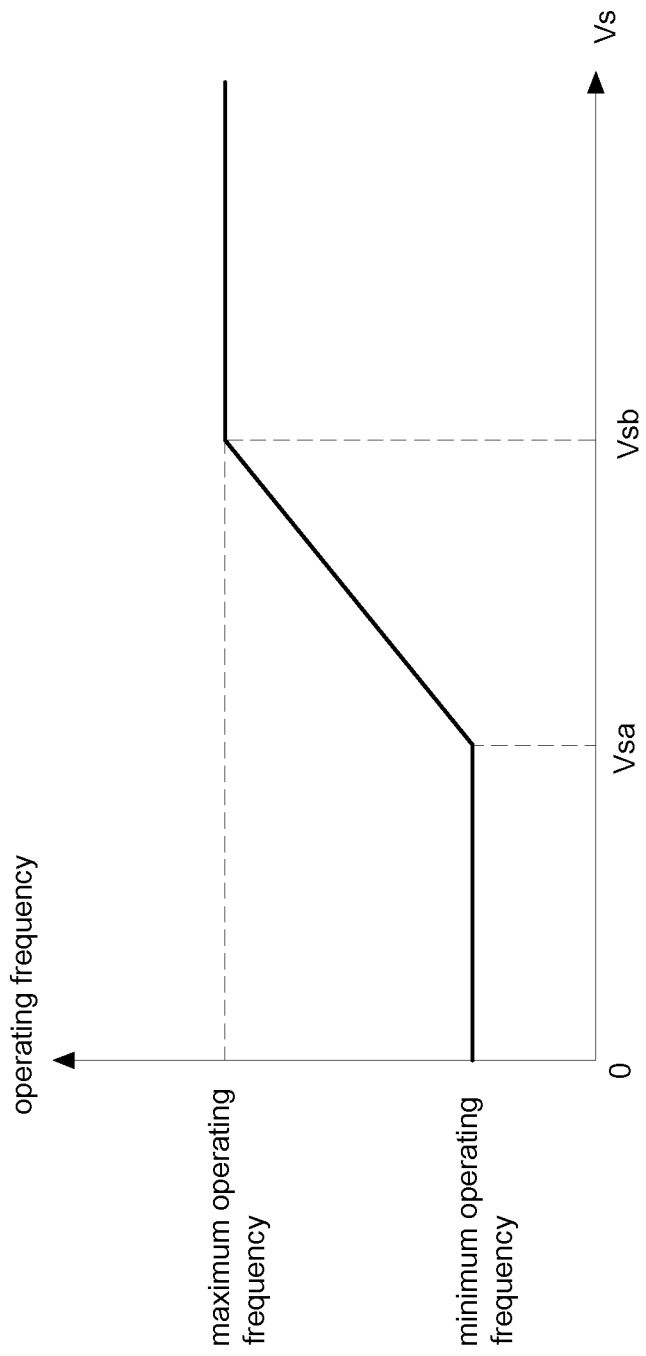
FIG. 13 shows a schematic diagram of the sampled signal of FIG. 12 versus the operating frequency.

Please refer to FIG. 6 again. The frequency limiting circuit 108 is configured to change (set) the internal current IRT based on the control signal Vcon to limit a maximum operating frequency and a minimum operating frequency of the operating frequency, which are described in detail as follows:

FIG. 13 shows a schematic diagram of the sampled signal Vs of FIG. 12 versus the operating frequency. Please refer to FIG. 6 and FIG. 12 at the same time. As mentioned above, when the sampled signal Vs is greater than the second value Vsb, the control signal Vcon is equal to the internal voltage VRT. At this time, in FIG. 6, because the control signal Vcon is equal to the internal voltage VRT, a second resistor current IR2 flowing through the second resistor R2 is zero, and the internal current IRT is equal to a first resistor current IR1 flowing through the first resistor R1, and the resistance value of the frequency limiting circuit 108 (namely, the total resistance value of the first resistor R1 and the second resistor R2) becomes the largest in the absence of the second resistor R2 (because the first resistor R1 and the second resistor R2 are connected in parallel). As mentioned above, when the pulse width modulation controller 110 belongs to the second-type pulse width modulation controller, the resistance value of the frequency limiting circuit 108 is proportional to the operating frequency. Therefore, when the resistance value of the frequency limiting circuit 108 is the maximum, the operating frequency is the maximum, and there is only the first resistance current IR1 flowing through the first resistor R1 at this time, so that the first resistor R1 is configured to set the maximum operating frequency of the operating frequency. Namely, the maximum operating frequency may be changed by changing the first resistor R1.

As mentioned above, when the sampled signal Vs is smaller than the first value Vsa, the control signal Vcon is zero voltage (namely, equivalent to ground). At this time, in FIG. 6, because the control signal Vcon is zero voltage, the internal current IRT is equal to the first resistor current IR1 plus the second resistor current IR2, and the resistance value of the frequency limiting circuit 108 becomes the minimum when the first resistor R1 is completely connected to the second resistor R2 in parallel. As mentioned above, when the pulse width modulation controller 110 belongs to the second-type pulse width modulation controller, the resistance value of the frequency limiting circuit 108 is proportional to the operating frequency. Therefore, when the resistance value of the frequency limiting circuit 108 is the minimum, the operating frequency is the minimum. Because the first resistor R1 has been used to set the maximum operating frequency, the second resistor R2 is configured to set the minimum operating frequency. Namely, the minimum operating frequency may be changed by changing the second resistor R2.

As mentioned above, when the sampled signal Vs is between the first value Vsa and the second value Vsb, the control signal Vcon is proportional to the sampled signal Vs (namely, if the sampled signal Vs is larger, the control signal Vcon is larger; if the sampled signal Vs is smaller, the control signal Vcon is smaller). At this time, when the pulse width modulation controller 110 belongs to the second-type pulse width modulation controller, the resistance value of the frequency limiting circuit 108 is proportional to the operating frequency. Therefore, if the sampled signal Vs is larger, the control signal Vcon is larger, the resistance value of the frequency limiting circuit 108 is larger, and the operating frequency gradually increases; if the sampled signal Vs is smaller, the control signal Vcon is smaller, the resistance value of the frequency limiting circuit 108 is smaller, and the operating frequency gradually decreases.

Figure 4:
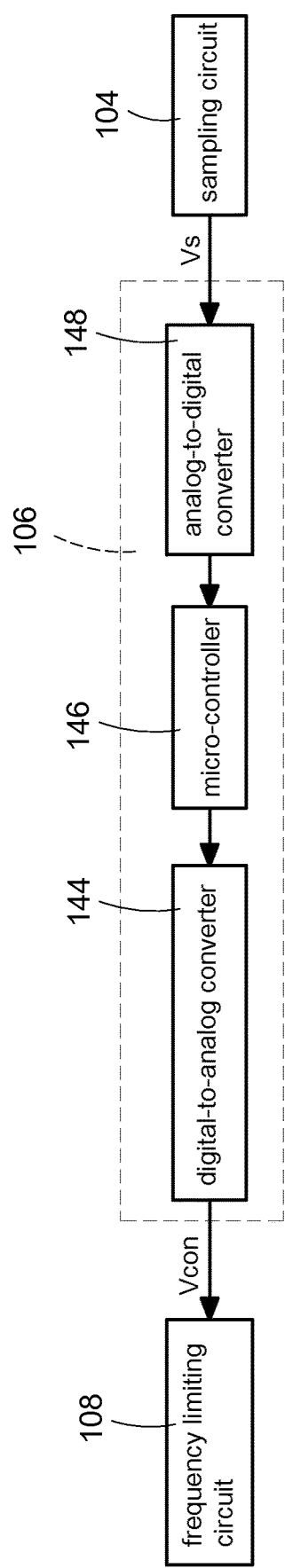
FIG. 4 shows a circuit diagram of the fourth embodiment of the signal gain adjustment circuit of the present disclosure.

FIG. 4 shows a circuit diagram of the fourth embodiment of the signal gain adjustment circuit 106 of the present disclosure. As shown in FIG. 4, the signal gain adjustment circuit 106 includes a digital-to-analog converter 144, a micro-controller 146 and an analog-to-digital converter 148. The micro-controller 146 is electrically connected to the digital-to-analog converter 144 and the analog-to-digital converter 148. Thanks to the micro-controller 146, the signal gain adjustment circuit 106 shown in FIG. 4 can be applied to both the first-type pulse width modulation controller and the second-type pulse width modulation controller, and can limit the maximum operating frequency and the minimum operating frequency as mentioned above. Namely, the micro-controller 146 is configured to control the control signal Vcon to determine the maximum operating frequency and the minimum operating frequency.

The applicable architectures of the improved switching power converting apparatus 10 of the present disclosure include Buck, Boost, Buck-Boost, Flyback, Forward, Half-Bridge, Full-Bridge and so on. The advantages of the present disclosure are to avoid the following problems caused by the fixed operating frequency: if the fixed operating frequency is high, the efficiency is low at light load; if the fixed operating frequency is low, the magnetic component is easy to saturate at heavy load. Namely, please refer to FIG. 9 or FIG. 13. When the load 20 (as shown in FIG. 1, FIG. 2 and FIG. 3) is light, the operating frequency may be decreased to decrease the switching loss to improve the efficiency. When the load 20 is heavy, the operating frequency may be increased to avoid saturation of the magnetic component, and the volume of the magnetic component may be reduced.

In addition, in order to avoid the incorrect operation of the output signal, the pulse width modulation controller usually has the setting of leading edge blanking time (TLEB). When there is no load or there is light load, because the duty cycle is extremely small, if the pulse conduction time (Ton) is less than TLEB, the pulse width modulation controller tends to be unstable, and then the problem of output instability (harmonic) occurs. Therefore, the present disclosure reduces the operating frequency at light load to make Ton greater than TLEB, so as to reduce the problem of unstable output caused by TLEB.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. An improved switching power converting apparatus (10) comprising:
    a power converting circuit (102);
    a sampling circuit (104) electrically connected to the power converting circuit (102);
    a signal gain adjustment circuit (106) electrically connected to the sampling circuit (104);
    a frequency limiting circuit (108) electrically connected to the signal gain adjustment circuit (106); and
    a pulse width modulation controller (110) electrically connected to the power converting circuit (102) and the frequency limiting circuit (108),
    wherein the sampling circuit (104) is configured to detect the power converting circuit (102) to obtain a sampled signal (Vs) and transmit the sampled signal (Vs) to the signal gain adjustment circuit (106); the signal gain adjustment circuit (106) is configured to adjust the sampled signal (Vs) to obtain a control signal (Vcon) and transmit the control signal (Vcon) to the frequency limiting circuit (108); the pulse width modulation controller (110) is configured to control an operating frequency of the pulse width modulation controller (110) based on the control signal (Vcon); the sampled signal (Vs) is obtained by detecting an output current (140) or an input current (158) by the sampling circuit (104).

2. The improved switching power converting apparatus (10) of claim 1, wherein the pulse width modulation controller (110) comprises:
    an oscillator timing control circuit (134) electrically connected to the frequency limiting circuit (108),
    wherein the oscillator timing control circuit (134) comprises:
    an internal voltage source (128) electrically connected to the frequency limiting circuit (108),
    wherein the internal voltage source (128) is configured to transmit an internal voltage (VRT) to the frequency limiting circuit (108) to generate an internal current (IRT) correspondingly; the frequency limiting circuit (108) is configured to change the internal current (IRT) based on the control signal (Vcon) to limit a maximum operating frequency and a minimum operating frequency of the operating frequency.

3. The improved switching power converting apparatus (10) of claim 2, wherein the frequency limiting circuit (108) comprises:
    a first resistor (R1) electrically connected to the pulse width modulation controller (110); and
    a second resistor (R2) electrically connected to the pulse width modulation controller (110), the signal gain adjustment circuit (106) and the first resistor (R1),
    wherein if a resistance value of the frequency limiting circuit (108) is inversely proportional to the operating frequency, the pulse width modulation controller (110) belongs to a first-type pulse width modulation controller; if the resistance value of the frequency limiting circuit (108) is proportional to the operating frequency, the pulse width modulation controller (110) belongs to a second-type pulse width modulation controller;

wherein if the pulse width modulation controller (110) belongs to the first-type pulse width modulation controller, the first resistor (R1) is configured to set the minimum operating frequency, and the second resistor (R2) is configured to set the maximum operating frequency, and the signal gain adjustment circuit (106) is configured to output the control signal: to be equal to the internal voltage (VRT) when the sampled signal (Vs) is less than a first value (Vsa), and to be inversely proportional to the sampled signal (Vs) when the sampled signal (Vs) is between the first value (Vsa) and a second value (Vsb), and to be a first level when the sampled signal (Vs) is greater than the second value (Vsb);

wherein if the pulse width modulation controller (110) belongs to the second-type pulse width modulation controller, the first resistor (R1) is configured to set the maximum operating frequency, and the second resistor (R2) is configured to set the minimum operating frequency, and the signal gain adjustment circuit (106) is configured to output the control signal (Vcon): to be the first level when the sampled signal (Vs) is less than the first value (Vsa), and to be proportional to the sampled signal (Vs) when the sampled signal (Vs) is between the first value (Vsa) and the second value (Vsb), and to be equal to the internal voltage (VRT) when the sampled signal (Vs) is greater than the second value (Vsb).

4. The improved switching power converting apparatus (10) of claim 3, wherein the pulse width modulation controller (110) further comprises:

a pulse width modulation control circuit (130) electrically connected to the power converting circuit (102) and the oscillator timing control circuit (134);

a comparator (132) electrically connected to the power converting circuit (102) and the pulse width modulation control circuit (130); and a comparator reference voltage source (150) electrically connected to the comparator (132), wherein the power converting circuit (102) comprises:

a voltage feedback circuit (124) electrically connected to the pulse width modulation controller (110); and an output end (126) electrically connected to the voltage feedback circuit (124), wherein the oscillator timing control circuit (134) further comprises:

a current mirror sub-circuit (136) electrically connected to the internal voltage source (128); and an oscillator (138) electrically connected to the current mirror sub-circuit (136) and the pulse width modulation control circuit (130), wherein the current mirror sub-circuit (136) is configured to correspondingly generate an oscillator current (Iosc) based on the internal current (IRT) and transmit the oscillator current (Iosc) to the oscillator (138); the oscillator (138) is configured to generate an operating clock (CLK) with the operating frequency based on the oscillator current (Iosc) and transmit the operating clock (CLK) to the pulse width modulation control circuit (130); the voltage feedback circuit (124) is configured to detect an output voltage (152) of the output end (126) to generate a feedback signal (Vfb) and transmit the feedback signal (Vfb) to the comparator (132); the comparator (132) is configured to compare the feedback signal (Vfb) with a comparator reference voltage (154) provided by the comparator reference voltage source (150) to generate a duty cycle signal (156) and transmit the duty cycle signal (156) to the pulse width modulation control circuit (130).

5. The improved switching power converting apparatus (10) of claim 4, wherein the pulse width modulation controller (110) belongs to the first-type pulse width modulation controller; the signal gain adjustment circuit (106) is an inverting amplifier.

6. The improved switching power converting apparatus (10) of claim 4, wherein the pulse width modulation controller (110) belongs to the second-type pulse width modulation controller; the signal gain adjustment circuit (106) is a non-inverting amplifier.

7. The improved switching power converting apparatus (10) of claim 4, wherein the pulse width modulation controller (110) belongs to the second-type pulse width modulation controller; the signal gain adjustment circuit (106) is a voltage follower.

8. The improved switching power converting apparatus (10) of claim 4, wherein the signal gain adjustment circuit (106) comprises:

a digital-to-analog converter (144) electrically connected to the frequency limiting circuit (108);

a micro-controller (146) electrically connected to the digital-to-analog converter (144); and an analog-to-digital converter (148) electrically connected to the micro-controller (146) and the sampling circuit (104).

9. The improved switching power converting apparatus (10) of claim 4, wherein the power converting circuit (102) further comprises:

a power switch (116) electrically connected to the pulse width modulation controller (110);

an input end (118) electrically connected to the power switch (116);

a transformer (120) electrically connected to the power switch (116); and a rectifier filter circuit (122) electrically connected to the transformer (120), the voltage feedback circuit (124) and the output end (126), wherein the pulse width modulation control circuit (130) is configured to control the power switch (116) based on the operating frequency of the operating clock (CLK) and the duty cycle signal (156).

10. The improved switching power converting apparatus (10) of claim 4, wherein the sampling circuit (104) comprises:

an output-end sampling sub-circuit (112) electrically connected to the power converting circuit (102) and the signal gain adjustment circuit (106); and an input-end sampling sub-circuit (114) electrically connected to the power converting circuit (102) and the signal gain adjustment circuit (106), wherein the output-end sampling sub-circuit (112) is configured to detect the power converting circuit (102) to obtain a first sampled signal (Vs1); the input-end sampling sub-circuit (114) is configured to detect the power converting circuit (102) to obtain a second sampled signal (Vs2); the sampling circuit (104) is configured to integrate the first sampled signal (Vs1) and the second sampled signal (Vs2) to obtain the sampled signal (Vs).

* * * * *